Patented Nov. 26, 1935

2,022,507

UNITED STATES PATENT OFFICE 2,022,507

POULTICE

Benjamin Hill, Wilkinsburg, Pa.

No Drawing. Application January 29, 1934,
Serial No. 708,911

14 Claims. (Cl. 167—58)

This invention relates to a poultice or application mass; and this application constitutes a continuation in part of my prior applications, Serial No. 493,920, filed November 6, 1930, and Serial No. 586,704, filed January 14, 1932.

One object of the invention is to provide a poultice forming a hygroscopic mass which is readily moldable manually, to conform to the part of the body to which it is applied.

Another object of the invention is to provide a poultice of the nature indicated which possesses high heat-insulating properties, while being unusually light and bulky.

A still further object of the invention is to provide a poultice of this character which is reusable, so that the same mass of material may be removed and reused a relatively great number of times.

Primarily, my invention resides in the combined use of a diatomaceous earth and a clay, together with glycerin, in my poultice. Either diatomaceous earth or clay, when mixed with glycerin, by itself is a material which may be applied to the human body, and which has been so applied. As uncombined with each other, however, these materials each lack several highly important qualities of my poultice. That is, neither of these materials, as mixed by itself with glycerin, gives a moldable and reusable poultice which is highly absorbent, which may be molded to the body in relatively great thickness, and which may be repeatedly removed and reused.

In making up my application mass, I take powdered diatomaceous earth and clay. The clay may be kaolin, fire clay, common clay, or any of the various friable or non-adhesive earths having a relatively high density in mass. This clay should be prepared for use by sterilization.

In selecting my diatomaceous earth, I use preferably such diatomaceous earth as has a particularly high particle porosity. Specifically, I prefer the diatomaceous earth which, having no distinguishing name other than its trade name, I define as "silocel." Desirably, the properties of this highly porous diatomaceous earth are improved for my purpose by calcination at a temperature approximately 900° F. Such calcination appears to so affect the particles of the diatomaceous earth as to increase the absorptive ability of the mass.

I have further found desirable a powdering of the clay such that it will pass a 60-mesh screen, and the silocel should, desirably, be capable of passing an 80-mesh screen.

According to my preferred method of manufacture, I roll the diatomaceous earth until it is largely in the form of loosely coherent pellets. These pellets I then roll while dry in the powdered clay, until each pellet has taken up a number of clay particles.

After this preparatory step, the solid ingredients of the mass are worked up with glycerin, until a firm plastic mass has been formed. While certain viscous materials might be used, to give a mass of the desired consistency, I have found no full equivalent for glycerin as to all desirable properties. It should, however, be understood that there may be found or developed a substantial equivalent for glycerin, both as to hygroscopic action and bonding qualities. By the word "glycerin" as used throughout the specification and claims, I intend to include any such practical equivalent for glycerin as may hereafter become available.

Within relatively wide limits, I may vary the proportions of diatomaceous earth and clay in my poultice, retaining, however, sufficient clay to avoid the formation of a mere slime, such as occurs when diatomaceous earth alone is mixed with glycerin. It will be understood that the density of the mass increases with an increased proportion of clay, and that the bulk and porosity of the mass are increased and its density decreased by an increase in the proportional quantity of diatomaceous earth. Thus for uses where a relatively dense poultice may be used, and bulk and lightness are not requisite, I have used clay to the proportion of 1 part of clay by volume to 5 volumes of diatomaceous earth. I have also, however, prepared a poultice having as high a proportion of diatomaceous earth as 10 volumes of the diatomaceous earth to 1 volume of clay. The quantity of glycerin is in any case readily determinable by adding glycerin and working it into the solid materials, until a mass of the desired consistency has been formed.

It is to be understood that my poultice, within the entire range of proportions given, is coherent, is readily moldable, and may repeatedly be used, removed, and worked up with the hands for further use.

It is frequently desirable to use a poultice having great bulk and relatively light weight per unit volume, these combined qualities being, as explained, increased by increase in the proportional volume of diatomaceous earth included in the mass. The procedure described above, of working together the clay and diatomaceous earth into dry pellets coated with clay, before the addition of the viscous binding material, is of importance in obtaining a satisfactory mass having my higher proportions of diatomaceous earth. This is for the reason that the initial pellets so distribute the diatomaceous earth and clay that the relatively great proportional quality of diatomaceous earth may be included in the poultice, without sacrifice of cohesion in the mass as made up with the glycerin.

It should be understood, however, that with the larger proportions of clay given the poultice so composed is highly porous, and readily moldable and reusable, while retaining adequate glycerin. It may here be noted that the glycerin is not evaporative within the sense of its described use. When, however, by repeated use an undue proportion of the glycerin in the mass has been dissipated, as by adhesion to external surfaces, the mass may be restored by adding and working in an added allowance of glycerin.

To still further increase the bulk of the poultice with respect to its weight, I have added some quantity of powdered cork, desirably using cork in such fineness of division that it will pass through a 10-mesh screen. The purpose of so finely dividing the cork is to prevent contact of unit particles of sufficient size to indent the skin when the poultice is used. As a formula typical of this modification in my poultice, I have made up the mass, using 9 parts by volume of diatomaceous earth, 3 parts by volume of powdered cork, and 1 part by volume of clay.

Desirably the procedure of making up the mass outlined above is followed in making up this modified mass or poultice material also. Thus I prefer to first pellet the diatomaceous earth and clay, and then to add the cork simultaneously with or subsequently to the addition of the glycerin.

For uses in which a marked local rise in body temperature is desired, it will be found that my poultice, in proportions including a maximum of diatomaceous earth to a minimum of clay, because of the increased bulk and porosity of the mass, is preferable. The heat-insulating effect attendant upon increase in porosity and bulk is still more marked when powdered cork is included in the mass.

It should be understood that, in all proportions and modifications given, my poultice is manually moldable and repeatedly reusable. The reusability of the poultice is of great importance, since it permits, when appropriate, the use of a great quantity of the material, without the waste and expense which would accompany an application of equal quantity of a material which might be used but once, or even a few times. The characteristic of my poulticing mass of reusability to an extent which is, within reason, indefinite thus renders its use possible in poulticing with a large mass over long periods of time, without exorbitant expense.

The life of the poulticing mass is greatly enhanced by the calcination of the diatomaceous earth. This calcination not only renders the particles of the diatomaceous earth more absorptive, but also renders this ingredient of the poultice, in mass, more resistant to disintegration and loss by the effect of water and body humors.

I do not intend specifically to limit my invention to the relative proportional range of diatomaceous earth and clay given above. That range defines proportions within which a poulticing mass of good to excellent porosity and heat-insulating bulk is found. If for any purpose it should prove desirable, a larger proportion of clay may be included, at a sacrifice of bulk and porosity.

It is of course, however, desirable for most purposes to obtain the approximate maximum of bulk and porosity consistent with ready moldability and reusability.

I claim as my invention:

1. The herein described plastic poulticing mass of firm manually moldable consistency and relatively light in weight comprising as solid ingredients in admixture diatomaceous earth in powdered form and clay in powdered form, together with glycerin as a hygroscopic bonding material in quantity sufficient to form with the mixed solid ingredients a coherent plastic mass; the mass as composed being capable of repeated use.

2. The herein described plastic poulticing mass of firm manually moldable consistency comprising as solid ingredients in admixture diatomaceous earth in powdered form and clay in powdered form, the clay being included in a proportion by volume no greater than one sixth the volume of the mass, together with glycerin as a hygroscopic bonding material in quantity sufficient to form with the mixed solid ingredients a coherent plastic mass; the mass as composed being capable of repeated use.

3. The herein described plastic poulticing mass of firm manually moldable consistency comprising as solid ingredients in admixture calcined diatomaceous earth of high particle porosity in powdered form and clay in powdered form, together with glycerin as a hygroscopic bonding material in quantity sufficient to form with the mixed solid ingredients a coherent plastic mass; the mass as composed being capable of repeated use.

4. The herein described plastic poulticing mass of firm manually moldable consistency comprising as solid ingredients in admixture diatomaceous earth in powdered form, clay in powdered form and powdered cork, together with glycerin as a hygroscopic bonding material in quantity sufficient to form with the diatomaceous earth and the clay a coherent plastic mass; the mass as composed being capable of repeated use.

5. The herein described plastic poulticing mass of firm manually moldable consistency comprising as solid ingredients in admixture calcined diatomaceous earth of high particle porosity in powdered form and clay in powdered form, the clay being included in a quantity by volume no greater than one sixth the volume of the combined solid ingredients, together with glycerin as a hygroscopic bonding material in quantity sufficient to form with the mixed solid ingredients a coherent plastic mass, and powdered cork; the mass as composed being capable of repeated use.

6. The herein described plastic poulticing mass of firm manually moldable consistency comprising as solid ingredients calcined diatomaceous earth of high particle porosity in powdered form and clay in powdered form and powdered cork, together with glycerin as a hygroscopic bonding material in quantity sufficient to form with the mixed solid ingredients a coherent plastic mass; the mass as composed being capable of repeated use.

7. A plastic application mass of firm manually moldable consistency and capable of repeated use comprising as solid ingredients in admixture an amorphous silicious material in powdered form having a particle porosity in powdered form greater than that of clay and clay in powdered form, together with a substantially neutral bonding fluid having general qualities of glycerin and approximately the bonding and hygroscopic qualities of glycerin in quantity sufficient to form with the mixed solid ingredients the coherent plastic mass.

8. A plastic application mass of firm manually moldable consistency and capable of repeated use comprising as solid ingredients in admixture diatomaceous earth in powdered form and a powdered non-adhesive filler cohesive and plastic when moist, together with a substantially neutral bonding fluid having the general qualities of glycerin and approximately the bonding and hygroscopic qualities of glycerin in quantity sufficient to form with the mixed solid ingredients the coherent plastic mass.

9. A plastic application mass of firm manually moldable consistency and capable of repeated use comprising as solid ingredients in admixture powdered diatomaceous earth of particularly high particle porosity and clay in powdered form, together with a substantially neutral bonding fluid having the general qualities of glycerin and approximately the bonding and hygroscopic qualities of glycerin in quantity sufficient to form with the mixed solid ingredients the coherent plastic mass.

10. A plastic application mass of firm manually moldable consistency and capable of repeated use comprising as solid ingredients in admixture powdered diatomaceous earth and powdered clay, the diatomaceous earth and clay being present in the approximate relative proportions of five parts of diatomaceous earth to one part of clay, both by volume; together with a substantially neutral bonding fluid having the general qualities of glycerin and approximately the bonding and hygroscopic qualities of glycerin in quantity sufficient to form with the mixed solid ingredients the coherent plastic mass.

11. The method of making a plastic application mass which comprises rolling diatomaceous earth in finely powdered condition into pellets, rolling the pellets of diatomaceous earth in powdered clay so that the clay adheres to the diatomaceous earth, and working the pellets of diatomaceous earth and clay with glycerin to produce a coherent plastic mass.

12. The method of making a plastic application mass which comprises rolling into pellets diatomaceous earth which has been calcined at a temperature approximating nine hundred degrees Fahrenheit and is in finely powdered condition, rolling the pellets of diatomaceous earth in powdered clay so that the clay adheres to the diatomaceous earth, and working the pellets of diatomaceous earth and clay with glycerin to produce a coherent plastic mass.

13. The herein described application mass of firm manually moldable consistency and capable of repeated use comprising as solid ingredients in admixture diatomaceous earth calcined at a temperature approximating nine hundred degrees Fahrenheit in powdered form and clay in powdered form, the relative proportions of the mixture being from six to ten parts by volume of diatomaceous earth to one part of clay, together with a neutral bonding fluid having the general qualities of glycerin and approximately the bonding and hygroscopic qualities of glycerin in quantity sufficient to form with the mixed solid ingredients the coherent plastic mass.

14. The herein described application mass of firm manually moldable consistency and capable of repeated use comprising as solid ingredients in admixture diatomaceous earth of particularly high particle porosity calcined at a temperature approximating nine hundred degrees Fahrenheit and clay, both the diatomaceous earth and the clay being in powdered form and being present in the relative proportions by volume of six to ten parts of diatomaceous earth to one part of clay, together with a neutral bonding fluid having the general qualities of glycerin and approximately the bonding and hygroscopic qualities of glycerin in quantity sufficient to form with the mixed solid ingredients the coherent plastic mass.

BENJAMIN HILL.